(12) United States Patent
Chang

(10) Patent No.: US 6,655,823 B2
(45) Date of Patent: Dec. 2, 2003

(54) ILLUMINATING APPARATUS FOR EXHAUST TAIL PIPE

(75) Inventor: Ming-Tien Chang, Fen-Yuan Hsiang (TW)

(73) Assignee: Liang Fei Industry Co., Ltd., Fen-Yuan Hsiang (TW)

( * ) Notice: Subject to any disclaimer, the term of this patent is extended or adjusted under 35 U.S.C. 154(b) by 0 days.

(21) Appl. No.: 10/096,866

(22) Filed: Mar. 14, 2002

(65) Prior Publication Data

US 2003/0174506 A1 Sep. 18, 2003

(51) Int. Cl.$^7$ ............... B60Q 1/00; B60Q 1/26
(52) U.S. Cl. ............ 362/487; 362/800; 362/464; 362/541; 362/543; 362/294; 362/545; 362/218; 362/253; 362/546
(58) Field of Search ................ 362/464, 485, 362/540, 541, 543, 487, 800, 294, 545, 218, 473, 293, 253, 546; 181/227

(56) References Cited

U.S. PATENT DOCUMENTS 6,491,418 B1 * 12/2002 Chen ..................... 362/487
6,582,108 B1 * 6/2003 Liang .................... 362/487

* cited by examiner

Primary Examiner—Sandra O'Shea
Assistant Examiner—Sharon Payne
(74) Attorney, Agent, or Firm—Rosenberg, Klein & Lee

(57) ABSTRACT

An illuminating apparatus for an exhaust tail pipe includes an outer duct, an inner duct located in the outer duct, an illuminating means located between the outer duct and the inner duct, and a conductive wire linking the illuminating means to brake lights to enable the illuminating means to emit light synchronously with the brake lights. The illuminating means includes a front anchoring lid, a front insulation pad, at least one LED panel, a rear insulation pad, a rear anchoring lid, an asbestos heat insulation pad and a plug lid. Because the LED panel is sandwiched by the insulation pads on the front and the rear side, the front anchoring lid and the inner duct form an interval therebetween, and the plug lid and the outer duct have radiation openings formed on the periphery thereof and form a radiation space, the LED panel and the conductive wire may be prevented from damaging in high temperature.

2 Claims, 5 Drawing Sheets

ILLUMINATING APPARATUS FOR EXHAUST TAIL PIPE

BACKGROUND OF THE INVENTION

1. Field of the Invention

The invention relates to an illuminating apparatus for exhaust tail pipe and particularly to an exhaust tail pipe that has a well-insulated illuminating apparatus.

2. Description of the Prior Art

Exhaust tail pipes provide channels for cars and motorcycles to discharge exhaust gas. In order to equip the exhaust tail pipe with an alert effect, applicant has proposed an illuminating apparatus to connect to the brake lights and may emit light synchronously with the brake light. However the exhaust tail pipe is made of metal, the LED panel located therein is prone to damage due to high temperature. As indicated in ROC Patent publication No. 418988, entitled: "Exhaust tail pipe", neon lights are directly fastened to the surface of an outer duct. While it can form light beam, the neon light is directly mounted on the interior surface of the outer duct and tends to malfunction in high temperature. In view of aforesaid disadvantages, Applicant has developed an improved illuminating apparatus for exhaust tail pipes to enhance alert effect and also to provide a multiple-layer heat insulation apparatus and radiating openings to achieve more effective heat insulation to prevent LED panels and conductive wires from damaging in high temperature.

SUMMARY OF THE INVENTION

The primary object of the invention is to provide an illuminating apparatus for an exhaust tail pipe that connects to brake lights to enhance alert effect.

Another object of the invention is to provide an illuminating apparatus for an exhaust tail pipe that has an excellent heat insulation effect to increase durability of LED panels and conductive wires.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
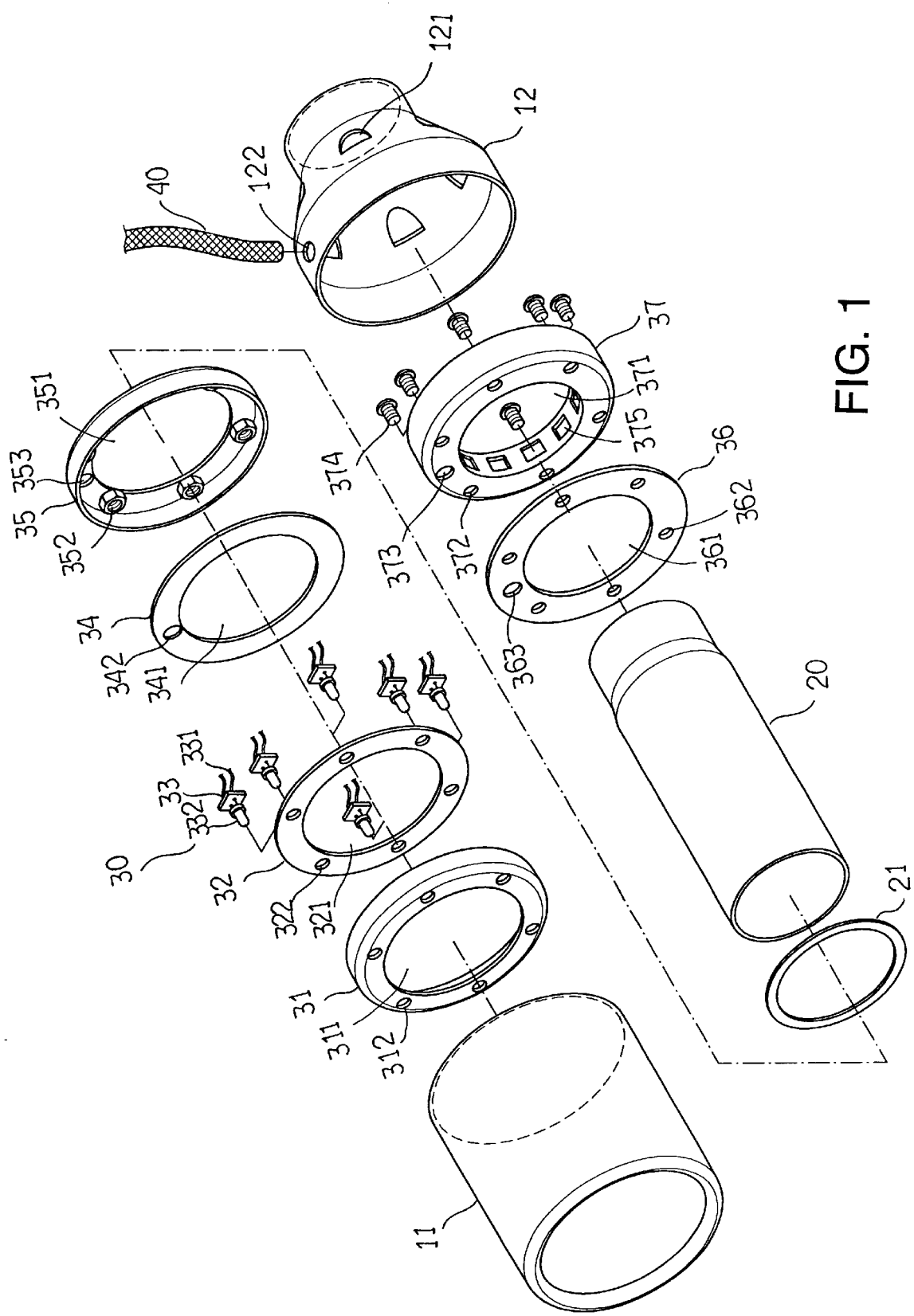
FIG. 1 is an exploded view of the invention.
Figure 2:
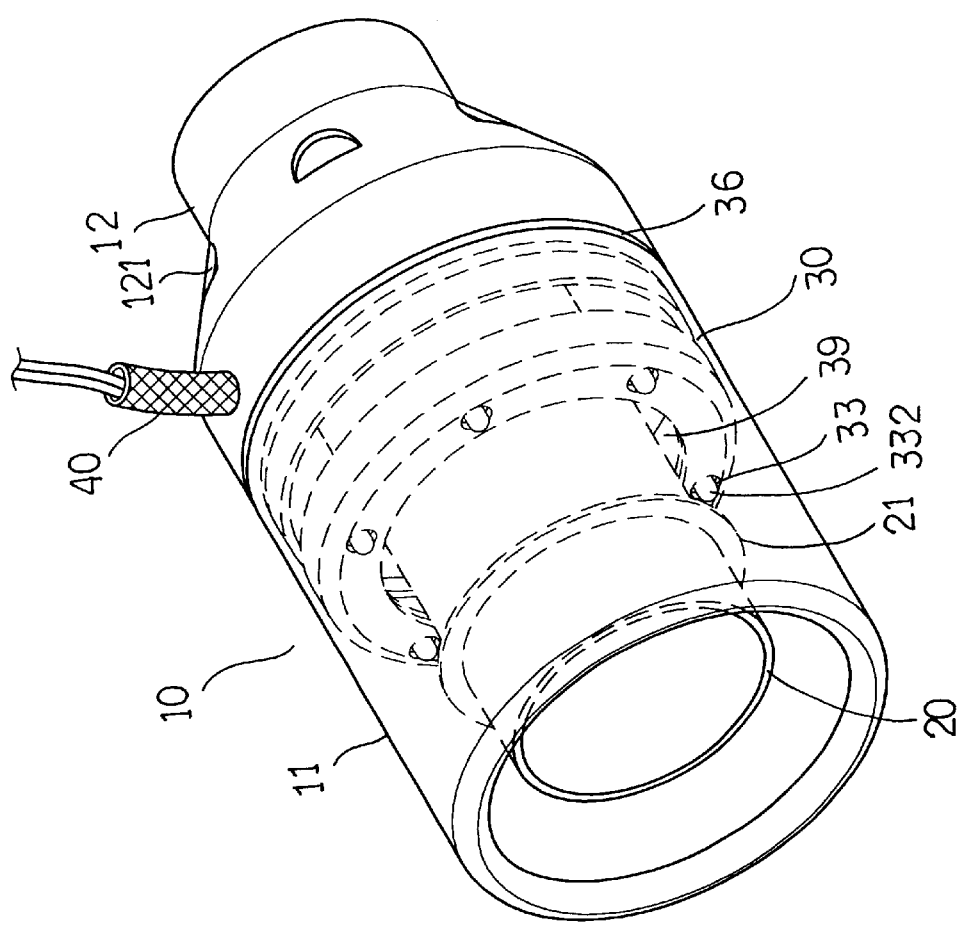
FIG. 2 is a perspective view of the invention.
Figure 3:
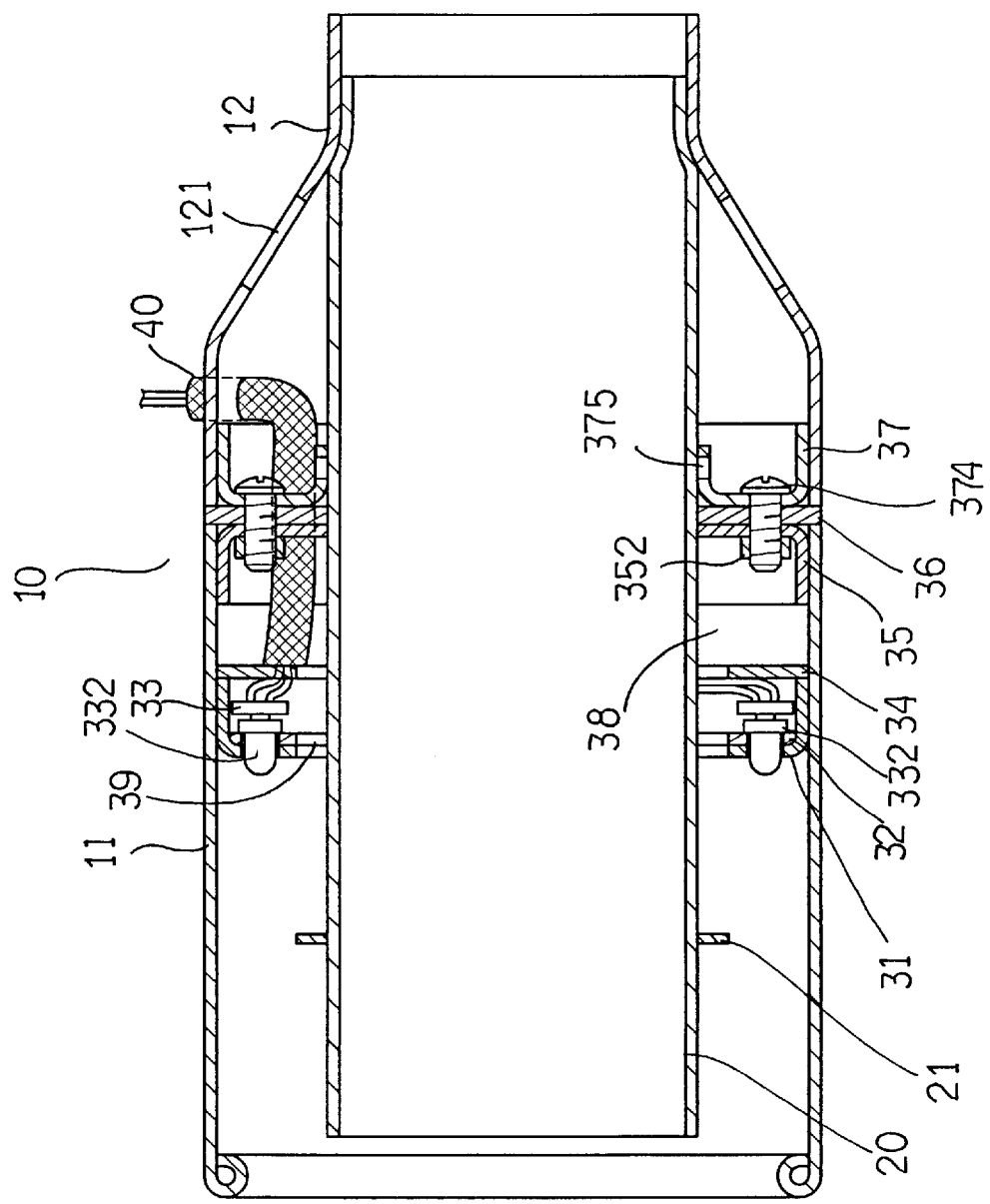
FIG. 3 is a sectional view of the invention.

Referring to FIGS. 1, 2 and 3, the illuminating apparatus for an exhaust tail pipe of the invention generally includes an outer duct 10, an inner duct 20 located in the outer duct 10, an illuminating means 30 located between the outer duct 10 and the inner duct 20, and a conductive wire 40 linking the illuminating means 30 to brake lights (not shown in the drawings). The illuminating means 30 is enabled to emit light synchronously with the brake lights.

The outer duct 10 consists of a front tube 11 and a rear tube 12. The rear tube 12 has radiating openings 121 formed on the periphery thereof and a first guiding hole 122. There is an asbestos heat insulation pad 36 located between the rear tube 12 and the front tube 11. The inner duct 20 includes a light shade ring 21 soldered on a front section thereof The illuminating means 30 includes a front anchoring lid 31 formed as a concave annular lid having an outer peripheral rim connecting the inner peripheral rim of the outer duct 10, and a first opening 311 formed in the center thereof with a diameter greater than the diameter of the inner duct 20 to allow the inner duct 20 to pass through. At least one first aperture 312 is formed on the end surface of the front anchoring lid 31 for coupling with LED light bulbs 332 located on LED panels 33.

A front insulation pad 32 located in the front anchoring lid 31 has a second opening 321 formed in the center thereof with a diameter greater than the diameter of the inner duct 20 to allow the inner duct 20 to pass through. At least one second aperture 322 is formed on the front insulation pad 32 for coupling with the LED light bulbs 332 located on the LED panels 33.

At least one LED panel 33 is attached to wires 331 for linking to the conductive wire 40. Each LED panel 33 has at least one LED light bulb 332 (the LED panel 33 controls on, off or blinking of the light bulb 332).

A rear insulation pad 34 located on a rear side of the front anchoring lid 31 has a third opening 341 formed in the center thereof with a diameter greater than the diameter of the inner duct 20 to allow the inner duct 20 to pass through. The rear insulation pad 34 has formed therein a second guiding hole 342 to allow the conductive wire 40 to pass through.

A rear anchoring lid 35 formed as a concave annular lid has a fourth opening 351 formed in the center thereof to couple with the inner duct 20. A plurality of screw nuts 352 and a third guiding hole 353 are located on the inner periphery of an end surface of the rear anchoring lid 35.

The asbestos heat insulation pad 36 has third apertures 362 formed thereon corresponding to the screw nuts 352 and a third guiding hole 363 to allow the conductive wire 40 to pass through.

A plug lid 37 formed as a concave annular lid has a fifth opening 371 formed in the center thereof to couple with the inner duct 20, and a plurality of fourth apertures 372 formed on an end surface corresponding to the screw nuts 352 of the rear anchoring lid 35 to engage with screws 374 to fasten to the screw nuts 352. The plug lid 37 also has a fourth guiding hole 373 to allow the conductive wire 40 to pass through, and a plurality of radiating openings 375 formed on an inner peripheral rim thereof.

The conductive wire 40 has one end connecting the brake lights. Another end of the conductive wire 40 sequentially threads through the first guiding hole 122 of the outer duct 10, the guiding holes 373, 363, 353 and 342 of the plug lid 37, asbestos insulation pad 36, rear anchoring lid 35 and rear insulation pad 34, then connects to the wires 331 of the LED panel 33.

By means of the construction set forth above, the illuminating means 30 and the inner duct 20 form a desired interval 39 therebetween (as the openings 311, 321, 341 of the front anchoring lid 31, the front insulation pad 32 and the rear insulation pad 33 have greater diameters than the inner duct 20). Moreover, there is a radiating space 38 formed between the front anchoring lid 31 and the rear anchoring lid 35, and the LED panel 33 is sandwiched by the insulation pads 32 and 34 from the front and the rear side, hence the LED panel 33 may be prevented from damaging in high temperature. In addition, the rear tube 12 of the outer duct 10 and the plug lid 37 have respectively radiation openings 121 and 375 to further improve heat radiating effect.

Figure 4:
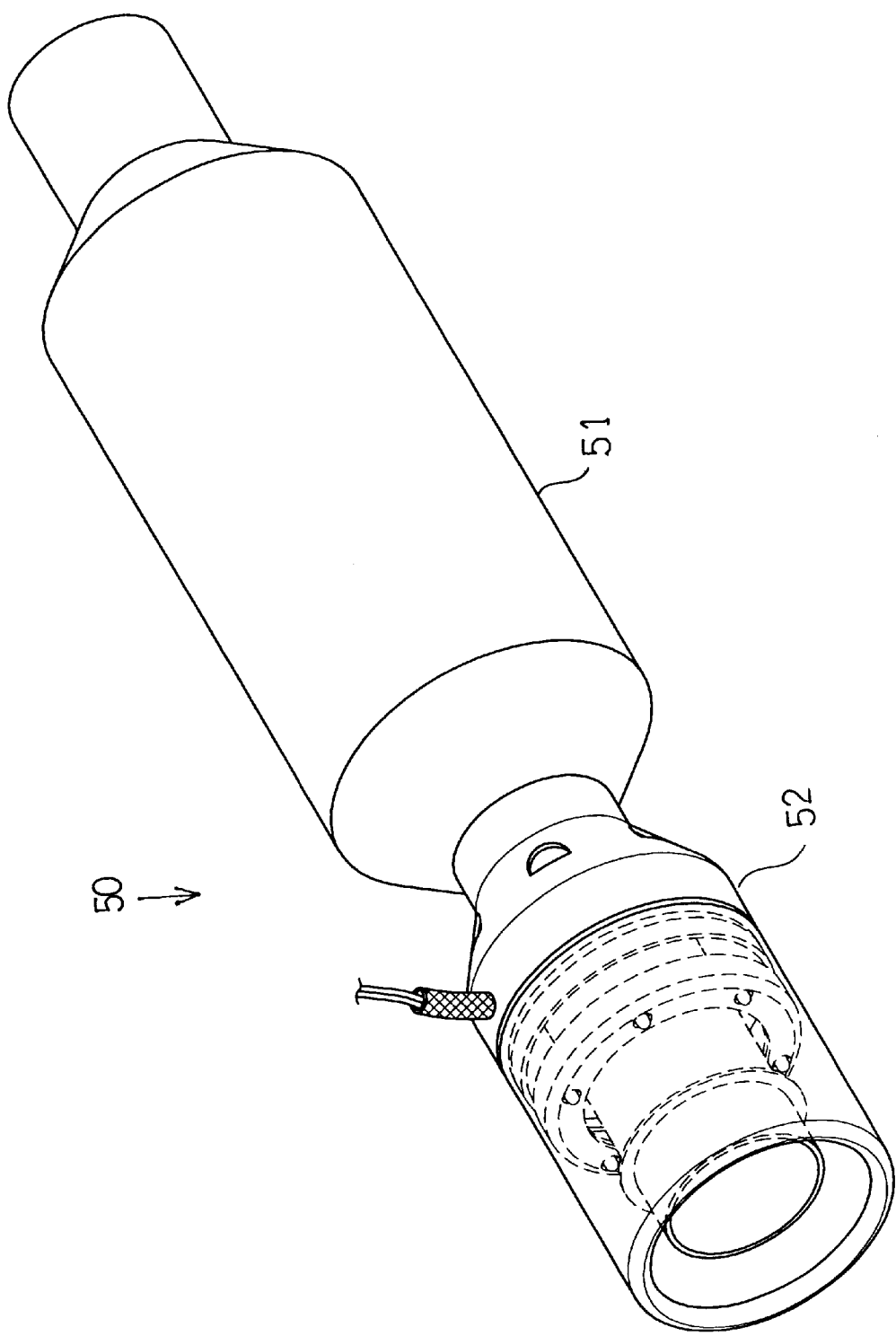
FIG. 4 is a perspective view of an embodiment of the invention.
Figure 5:
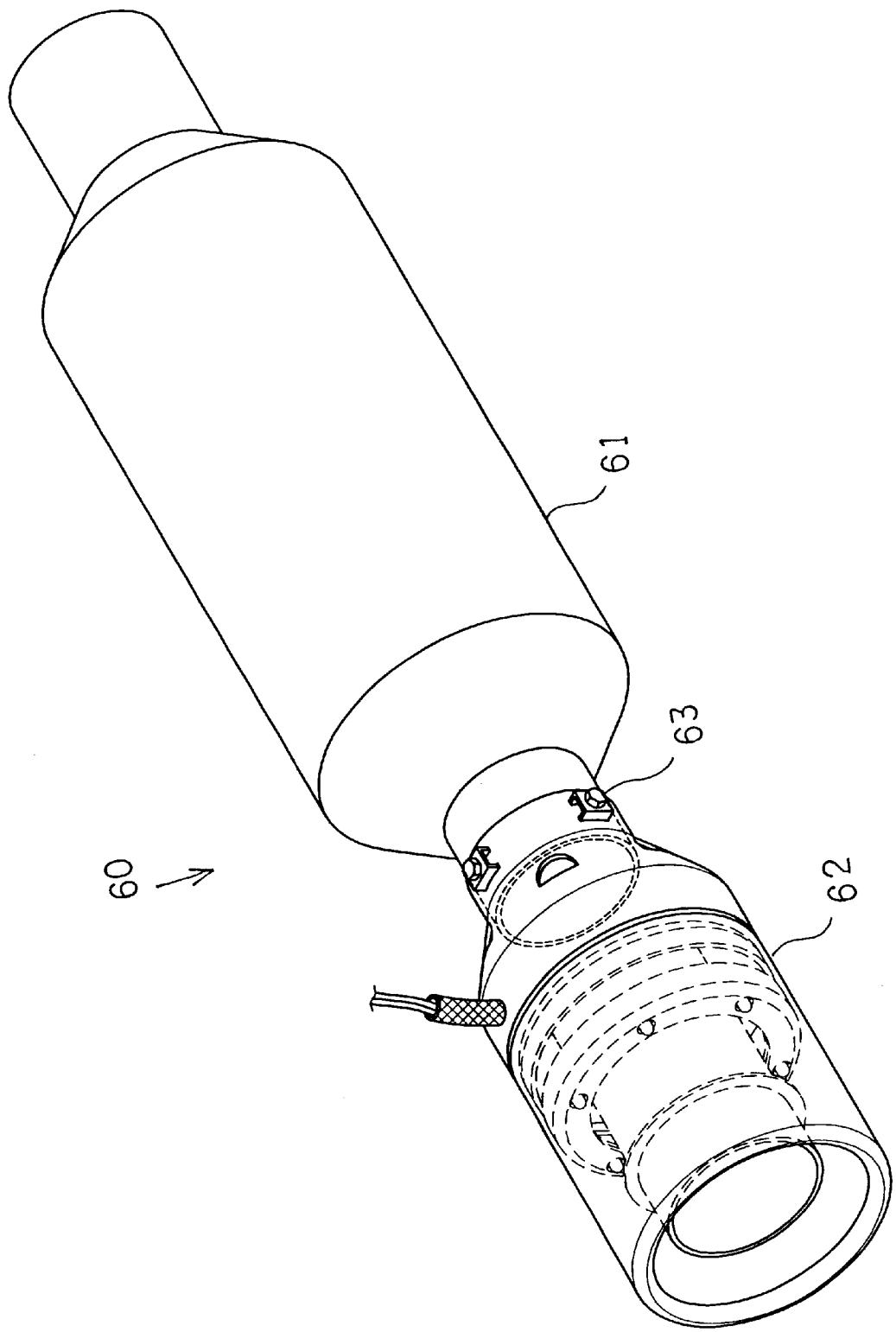
FIG. 5 is a perspective view of another embodiment of the invention.

Referring to FIG. 4, the exhaust tail pipe 52 of the invention may be integrally made with a muffler 51 to form an exhaust apparatus 50. As shown in FIG. 5, the exhaust tail pipe 62 of the invention may also be fastened to a muffler 61 by means of fastening elements 63 to form an exhaust apparatus 60.

As the exhaust tail pipe of the invention includes an illuminating means 30 which is connected to the brake lights, when the brake is activated, the illuminating means also emits light, thus can enhance alert effect.

While the preferred embodiments of the invention have been set forth for the purpose of disclosure, modifications of the disclosed embodiments of the invention as well as other embodiment thereof may occur to those skilled in the art. Accordingly, the appended claims are intended to cover all embodiments which do not depart from the spirit and scope of the invention.

I claim:

1. An illuminating apparatus for an exhaust tail pipe comprising an outer duct, an inner duct located in the outer duct, an illuminating means located between the outer duct and the inner duct, and a conductive wire linking the illuminating means to brake lights to allow the illuminating means to emit light synchronously with the brake lights, wherein:

the outer duct including a front tube and a rear tube and an asbestos heat insulation pad located therebetween, the rear tube having a plurality of radiating openings formed on a periphery thereof and a first guiding hole;

the illuminating means including:

a front anchoring lid formed as a concave annular lid having an outer peripheral rim connecting an inner peripheral rim of the outer duct, and a first opening formed in the center thereof with a diameter greater than the diameter of the inner duct to allow the inner duct to pass through, and at least one first aperture formed on an end surface thereof for coupling with LED light bulbs located on a LED panel;

a front insulation pad located in the front anchoring lid having a second opening formed in the center thereof with a diameter greater than the diameter of the inner duct to allow the inner duct to pass through, and at least one second aperture formed thereon for coupling with the LED light bulbs located on the LED panel;

at least one LED panel linking to the brake lights through the conductive wire and having at least one LED light bulb located thereon;

a rear insulation pad located on a rear side of the front anchoring lid having a third opening formed in the center thereof with a diameter greater than the diameter of the inner duct to allow the inner duct to pass through, and a second guiding hole to allow the conductive wire to pass through;

a rear anchoring lid formed as a concave annular lid having a fourth opening formed in the center to couple with the inner duct, and a plurality of screw nuts and a third guiding hole located on the inner periphery of the end surface thereof;

the asbestos heat insulation pad having third apertures formed thereon corresponding to the screw nuts of the rear anchoring lid; and a plug lid formed as a concave annular lid having a fifth opening formed in the center thereof to couple with the inner duct, and a plurality of fourth apertures formed on an end surface thereof corresponding to the screw nuts of the rear anchoring lid to engage with screws for fastening to the screw nuts, and a fourth guiding hole to allow the conductive wire to pass through, and a plurality of radiating openings formed on an inner peripheral rim thereof;

the conductive wire having one end connecting the brake lights and another end connecting wires of the LED panel.

2. The illuminating apparatus for an exhaust tail pipe of claim 1, wherein the inner duct has a light shade ring soldered on a front section thereof.

* * * * *